(12) United States Patent
Burford et al.

(10) Patent No.: US 8,163,121 B2
(45) Date of Patent: Apr. 24, 2012

(54) METHODS FOR AFFIXING OVERLAY SHEETS TO CONCRETE FORM

(75) Inventors: Jeremy Burford, Alexandria, LA (US); Todd Burton, Alexandria, LA (US); Stanley Flenniken, Natchitoches, LA (US)

(73) Assignee: Roy O. Martin Lumber Co., Alexandria, LA (US)

( * ) Notice: Subject to any disclaimer, the term of this patent is extended or adjusted under 35 U.S.C. 154(b) by 128 days.

(21) Appl. No.: 12/750,142

(22) Filed: Mar. 30, 2010

(65) Prior Publication Data

US 2011/0240216 A1      Oct. 6, 2011

(51) Int. Cl.
*B29C 65/02* (2006.01)
*B32B 37/02* (2006.01)
*B32B 37/04* (2006.01)
*B32B 37/18* (2006.01)
*B32B 38/04* (2006.01)

(52) U.S. Cl. .......... 156/264; 156/300; 156/307.7; 156/309.6; 156/281; 156/306.3

(58) Field of Classification Search .......... 156/264, 156/270, 300, 302, 307.7, 308.3, 309.6, 64, 156/281, 306.3
See application file for complete search history.

(56) References Cited

U.S. PATENT DOCUMENTS

| | | | | |
|---|---|---|---|---|
| 2,033,855 A | * | 3/1936 | Sloan | 428/187 |
| 2,323,105 A | * | 6/1943 | Welch | 156/264 |
| 3,101,994 A | * | 8/1963 | Hartmann | 264/247 |
| 7,537,669 B2 | * | 5/2009 | Jarck | 156/264 |
| 2010/0032081 A1 | * | 2/2010 | Green | 156/219 |

* cited by examiner

*Primary Examiner* — Linda L Gray
(74) *Attorney, Agent, or Firm* — Winston & Strawn LLP

(57) ABSTRACT

A resin impregnated overlay sheet is laid atop a wood veneer to create a concrete form. At a pre-press station, pressure is applied to a veneer assembly having an overlay sheet laid atop it. Thereafter, the pressed overlaid assembly is transferred for final hot pressing. The pre-pressing of the overlay sheet onto the wood veneer ensures the static adherence of the overlay sheet to the veneer prior to final hot pressing.

6 Claims, 3 Drawing Sheets

METHODS FOR AFFIXING OVERLAY SHEETS TO CONCRETE FORM

FIELD OF THE INVENTION

The present invention relates generally to concrete forms and, more particularly, to methods for applying overlay sheets to veneer assemblies in order to manufacture the concrete forms more efficiently.

SUMMARY OF THE INVENTION

The present invention provides methods for manufacturing a form using an assembly line. An assembly of veneers is cut, cleaned, and transported to a side shift location. At the side shift location, an overlay sheet is applied to the top layer of the veneer assembly to create an overlaid assembly, and the overlaid assemblies are stacked to create a unit. The unit is then transported to a pre-press station for pre-pressing. Pressure is then applied for a pre-determined period, thereby pressing the veneer assemblies together such that the veneers stick to each other and their corresponding overlay sheet. Thereafter, the unit is transported to a hot press for final bonding.

DESCRIPTION OF ILLUSTRATIVE EMBODIMENTS

Illustrative methodologies of the invention are described below as they might be employed to manufacture concrete forms. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various methodologies of the invention will become apparent from consideration of the following description and drawings.

Figure 1:
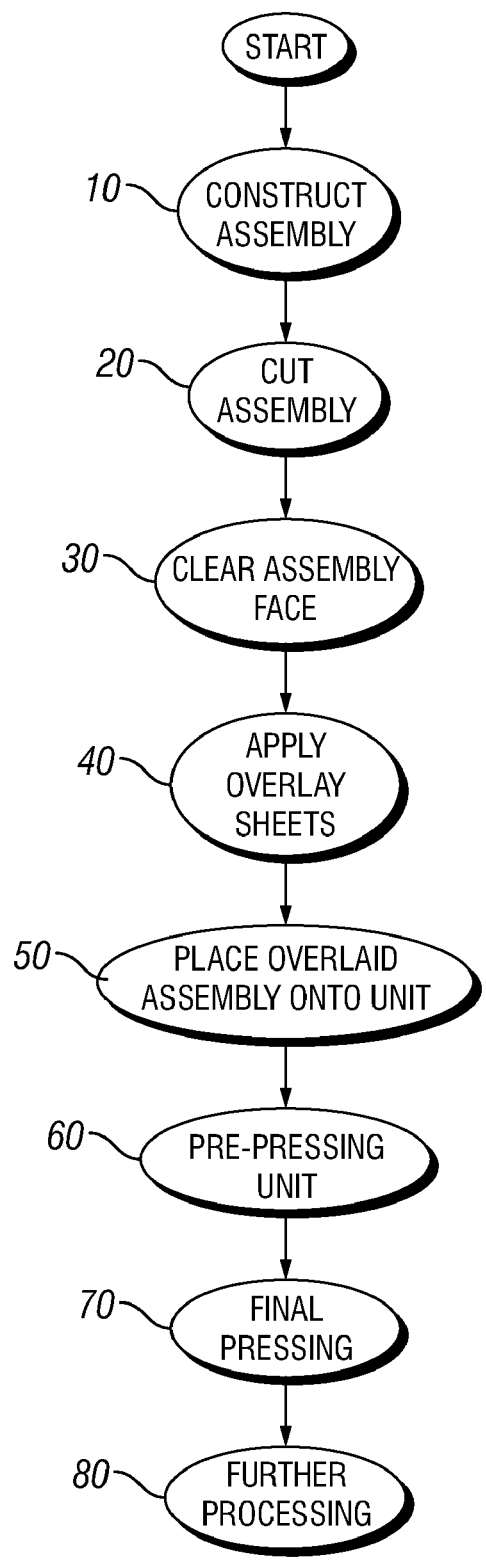
FIG. 1 is a flow chart illustrated an exemplary methodology of the present invention.

FIG. 1 is a flow chart illustrating an exemplary method of the present invention whereby an overlay sheet is applied during the manufacturing of a concrete form. At step (10), a plywood veneer is constructed according to any method known in the art. In this exemplary embodiment, the veneer assembly (i.e., stacked veneers with glue in-between) is assembled using Southern Group 1 face, back and core veneers on a continuous run foam line lay-up process as understood in the art. In this embodiment, the veneer assembly moves via an automated assembly, such as a conveyor belt system. However, those skilled in the art having the benefit of this disclosure realize the process may also employ human assistance or some combination of human and mechanical automation. In addition, those skilled in the art having the benefit of this disclosure realize other materials may be used in place of the wood veneers, such as, for example, metals, plastics, etc.

As the veneer assembly moves to the end of the foam line, each is cut using a flying cut-off saw at step (20). As the veneer assembly moves further along the conveyor system, at step (30), an automated blower system removes saw dust and other wood particles from the face of the veneer assembly. At step (40), and referring to FIG. 2, the clean cut veneer assembly 100 moves onto a side shift location where an overlay sheet 102 is manually placed on the face of the assembly. Side shifts are well known in the art. Also, there are a variety of overlay sheets which may be utilized such as, for example, a thermosetting phenolic resin impregnated cellulose-fiber sheet, having an additional resin coating on the back of the sheet, manufactured by Arclin™.

Figure 2:
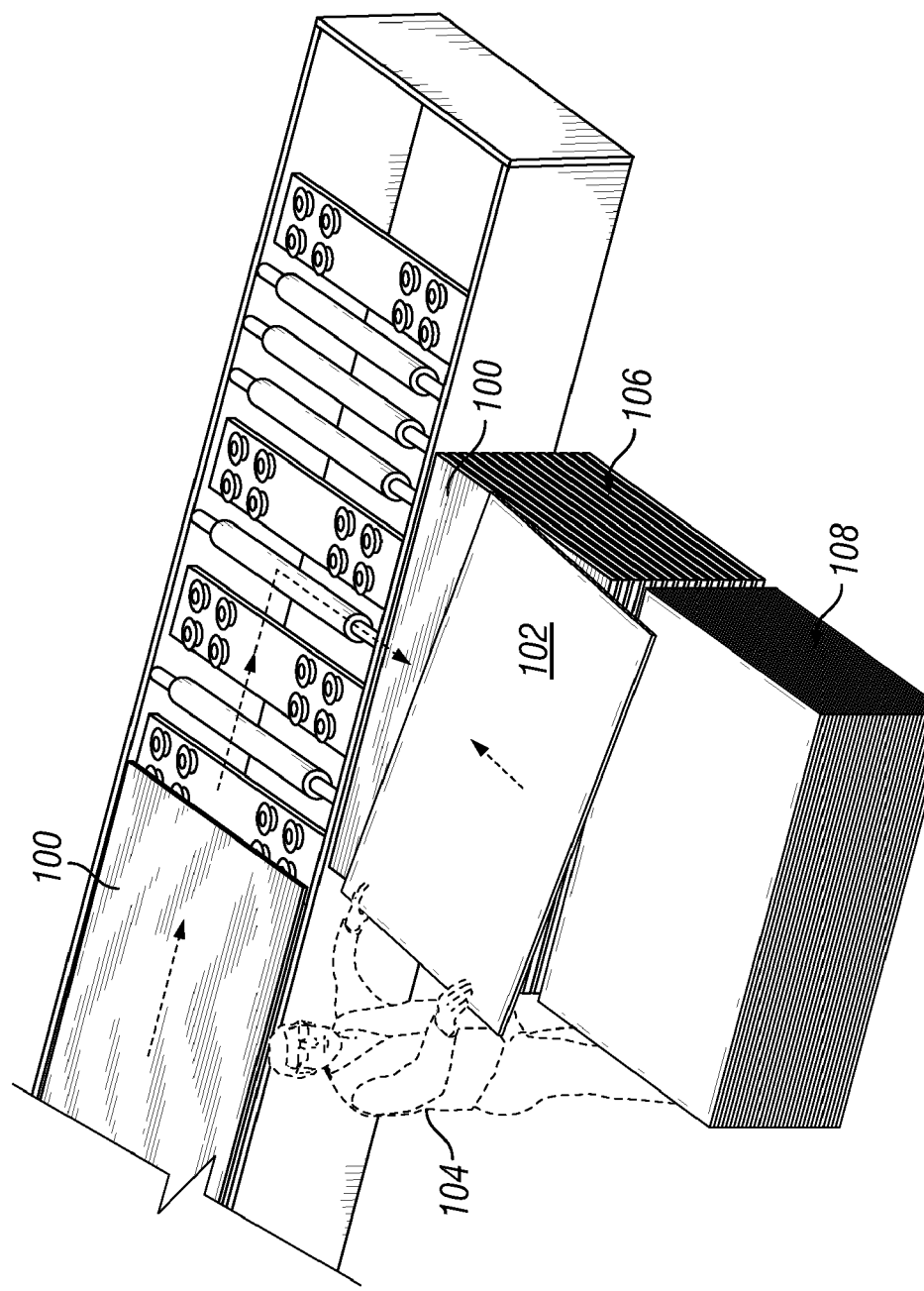
FIG. 2 is a pictorial illustration of step (40) of FIG. 1 according to an exemplary methodology of the present invention.

In further reference to FIG. 2, a human operator 104 stands adjacent the side shift location to place overlay sheet 102 onto each veneer assembly 100 as it is forced onto overlaid assembly unit 106. As veneer assembly 100 is forced onto overlaid assembly unit 106, operator 104 places an overlay sheet 102, taken from overlay stack 108 placed adjacent to overlaid assembly unit 106, onto the top of veneer assembly 100 such that there is no interruption in the conveyor process. As such, the assembly just overlaid will rest atop unit 106 as another veneer assembly 100 moves onto the side shift location, and the process repeats. Although described herein in conjunction with a human operator, those ordinarily skilled in the art having the benefit of this disclosure realize the overlay step can also be automated. In addition, the placement of the overlay sheet can be guided by light sensors to ensure proper positioning and alignment, as smoother flow, as would be understood in the art by those ordinarily skilled having the benefit of this disclosure.

Figure 3:
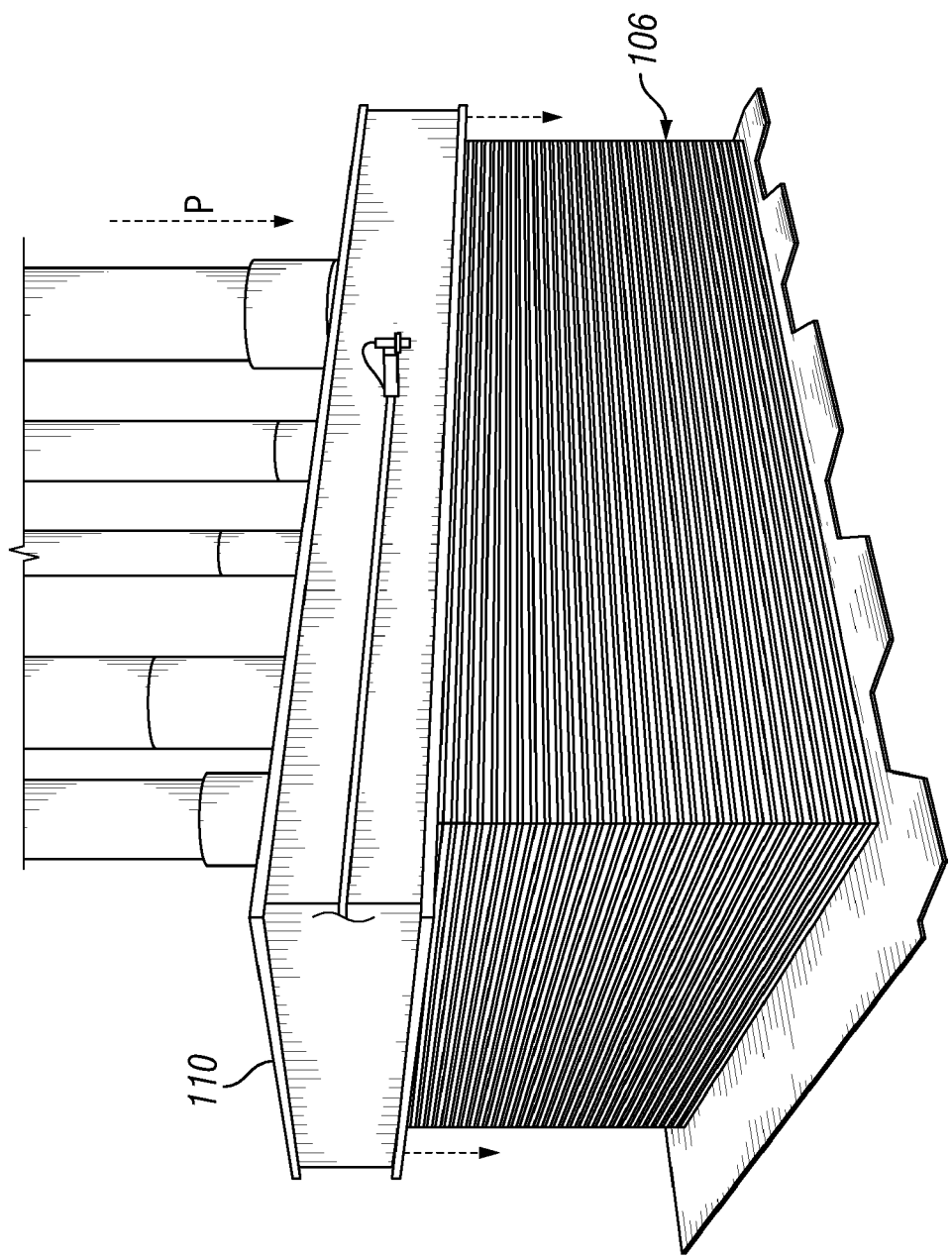
FIG. 3 is a pictorial illustration of step (60) of FIG. 1 according to an exemplary methodology of the present invention.

At step (50), the newly overlaid assembly is placed on a unit (i.e., a stack of overlaid assemblies). At this point in the process, there is nothing holding overlay sheet 102 to the veneer assemblies 100. Rather, the overlay sheet 102 is held on top of the veneer assemblies 100 by gravity. The unit is then transferred to a pre-press station at step (60), as illustrated in FIG. 3. Those ordinarily skilled in the art having the benefit of this disclosure realize there are a variety of pre-press stations which could be utilized with the present invention, such as, for example, a Globe™ pre-press.

Referring to FIG. 3, at the pre-press station 110 approximately 155 psi of pressure P is applied to the unit 106 for a period of 4.5-5 minutes. However, those ordinarily skilled in the art having the benefit of this disclosure understand the amount of pressure applied is dependent upon the type of wood utilized in the veneers. This pre-press process ensures the static adherence of the overlay sheet to the top of each veneer assembly prior to final pressing. Here, the assemblies are simply pressed together using extreme pressure and the pre-press creates intimate contact between the paper and the top of each veneer assembly, thereby creating a tackiness which allows them to stick to each; there is no heat involved. Thereafter, at step (70), the unit is transferred to a press charger and loaded into a plywood press, such as a 50 opening Spar-tek™ hot oil plywood press, for final pressing/bonding, thereby creating a panel. In addition, the face of the overlaid assemblies is cleaned using a blower prior to final pressing. At step (80), the panels are removed from the plywood press and sent for further processing, inspection and prepared for shipment.

Accordingly, methodologies of the present invention provide a method of manufacturing a form using an assembly line, the method comprising the steps of constructing an assembly comprising a plurality of wood veneers; cutting the assembly; cleaning a face of the assembly; transporting the assembly to a side shift location; applying an overlay sheet onto the face of the assembly at the side shift location to create an overlaid assembly, the application being accomplished by a human operator without interrupting movement of the assembly line; stacking the overlaid assembly onto a unit, the unit comprising a plurality of stacked overlaid assemblies; transporting the unit to a pre-press station; applying pressure to the unit for a pre-determined period, thereby pressing the overlaid assemblies together such the wood veneers stick to each other and their corresponding overlay sheet; and transporting the unit to a plywood press for final bonding, thereby creating the forms. In another exemplary methodology, the pressure applied at the pre-press is approximately 155 psi of pressure applied for a period of 4.5-5 minutes. In yet another exemplary methodology, no heat is applied at the pre-press station. In yet another methodology, heat is involved in the final bonding. In another exemplary methodology, the overlay sheet is resin impregnated and the resin assists in causing the wood veneers and overlay sheets to stick together during the pre-pressing. In another methodology, the form is a concrete form.

Methodologies of the present invention also provide a method of manufacturing a form, the method comprising the steps of constructing an assembly comprising a plurality of wood veneers; cutting the assembly; cleaning a face of the assembly; applying an overlay sheet onto the assembly face to create an overlaid assembly; and applying pressure to the overlaid assembly for a pre-determined period. In another exemplary methodology, the form is a concrete form. In yet another methodology, the pressure applied to the unit is approximately 155 psi of pressure applied for a period of 4.5-5 minutes. In another methodology, the step of transporting the overlaid assembly to a hot press wherein heat is applied for final bonding of the form. In the alternative, no heat is applied when the pressure is applied to the overlaid assembly for a pre-determined time. In yet another exemplary methodology, the overlay sheet is resin impregnated, and, when the pressure is applied to the overlaid assembly, the sheet and the assembly stick together in response to the applied pressure. In another methodology, the application of the overlay sheet is accomplished by a human operator, the overlay sheet being applied without interrupting movement of the assembly line. In another methodology, the overlay sheet is applied at a side shift location.

Methodologies of the present invention also provide a method of manufacturing a form, the method comprising the steps of applying an overlay sheet to an assembly face to create an overlaid assembly; applying pressure to the overlaid assembly; and transporting the overlaid assembly to a separate press for final pressing, thereby creating the form. In the alternative, the pressure applied to the overlaid assembly is approximately 155 psi of pressure applied for a period of 4.5-5 minutes and no heat is applied. In yet another methodology, heat is applied at the final pressing. In yet another exemplary methodology, the overlay sheet is applied at a side shift location. Also, the sheet may be applied by a human operator.

Although various embodiments have been shown and described, the invention is not limited to such embodiments and will be understood to include all modifications and variations as would be apparent to one skilled in the art. For example, those ordinarily skilled in the art having the benefit of this disclosure realize the methodologies of the present invention may be utilized to manufacture a variety of concrete forms, such as MDO concrete forms. Therefore, it should be understood that the invention is not intended to be limited to the particular forms disclosed. Rather, the intention is to cover all modifications, equivalents and alternatives falling within the spirit and scope of the invention as defined by the appended claims.

What is claimed is:

1. A method of manufacturing a form using an assembly line, the method comprising the steps of:
   (a) constructing an assembly comprising a plurality of wood veneers;
   (b) cutting the assembly;
   (c) cleaning a face of the assembly;
   (d) transporting the assembly to a side shift location;
   (e) applying an overlay sheet onto the face of the assembly at the side shift location to create an overlaid assembly, the application being accomplished by a human operator without interrupting movement of the assembly line;
   (f) stacking the overlaid assembly onto a unit, the unit comprising a plurality of stacked overlaid assemblies;
   (g) transporting the unit to a non-heated pre-press station;
   (h) applying pressure to the unit for a pre-determined period using the non-heated pre-press, thereby pressing the overlaid assemblies together such that the wood veneers stick to each other and their corresponding overlay sheet; and
   (i) transporting the unit to a plywood press for final bonding, thereby creating the forms.

2. A method as defined in claim 1, wherein the pressure applied to the unit in step (h) is approximately 155 psi of pressure applied for a period of 4.5-5 minutes.

3. A method as defined in claim 1, wherein heat is involved in step (i).

4. A method as defined in claim 1, wherein the overlay sheet is resin impregnated and the resin assists in causing the wood veneers and overlay sheets to stick together in step (h).

5. A method as defined in claim 1, wherein the form is a concrete form.

6. A method as defined in claim 1, wherein the overlay sheet is a resin impregnated cellulose-fiber sheet.

* * * * *